(12) United States Patent
Senior

(10) Patent No.: US 12,466,110 B2
(45) Date of Patent: Nov. 11, 2025

(54) TENNIS BALL RECYCLING SYSTEM, APPARATUS AND METHOD OF USE

(71) Applicant: RecycleBalls Inc., South Burlington, VT (US)

(72) Inventor: Derrick Senior, South Burlington, VT (US)

(73) Assignee: RecycleBalls Inc., South Burlington, VT (US)

( * ) Notice: Subject to any disclaimer, the term of this patent is extended or adjusted under 35 U.S.C. 154(b) by 314 days.

(21) Appl. No.: 17/693,290

(22) Filed: Mar. 11, 2022

(65) Prior Publication Data

US 2022/0288813 A1  Sep. 15, 2022

Related U.S. Application Data

(60) Provisional application No. 63/159,900, filed on Mar. 11, 2021.

(51) Int. Cl.
| | | |
|---|---|---|
| *B29B 17/02* | (2006.01) | |
| *B02C 18/06* | (2006.01) | |
| *B02C 18/18* | (2006.01) | |
| *B07B 1/22* | (2006.01) | |
| *B09B 3/35* | (2022.01) | |
| B29K 21/00 | (2006.01) | |
| B29K 77/00 | (2006.01) | |
| B29L 31/54 | (2006.01) | |

(52) U.S. Cl.
CPC .............. *B29B 17/02* (2013.01); *B02C 18/18* (2013.01); *B09B 3/35* (2022.01); *B02C 18/06* (2013.01); *B07B 1/22* (2013.01); *B29B 2017/0203* (2013.01); *B29B 2017/0224* (2013.01); *B29B 2017/0231* (2013.01); *B29K 2021/00* (2013.01); *B29K 2077/00* (2013.01); *B29L 2031/548* (2013.01); *Y02W 30/52* (2015.05); *Y02W 30/62* (2015.05); *Y10S 241/31* (2013.01)

(58) Field of Classification Search
CPC .................... Y10S 241/31; B29L 2031/548
USPC ............... 241/24.17, 24.27, DIG. 31
See application file for complete search history.

(56) References Cited

U.S. PATENT DOCUMENTS

| | | | | |
|---|---|---|---|---|
| 3,650,396 A | * | 3/1972 | Gillespie | B03B 9/062 |
| | | | | 241/DIG. 38 |
| 4,156,508 A | * | 5/1979 | Kisielewski | B02C 18/142 |
| | | | | 241/DIG. 31 |
| 7,325,757 B2 | * | 2/2008 | Allen | B29B 17/02 |
| | | | | 241/34 |

(Continued)

FOREIGN PATENT DOCUMENTS

| | | | | | |
|---|---|---|---|---|---|
| CN | 112936364 A | * | 6/2021 | ............ | B29B 17/02 |
| EP | 4052878 A1 | * | 9/2022 | ......... | B29B 17/0042 |

*Primary Examiner* — Jared O Brown
(74) *Attorney, Agent, or Firm* — Aspiro Legal, LLC

(57) ABSTRACT

A system and method for tennis ball recycling that processes tennis balls into one or more constituent components to generate useful products is disclosed. The system includes a hopper to hold the balls for recycling; a grinder having a plurality of blades to initially cut the tennis balls in a first step to separate the rubber from the nylon; a cyclonic extractor that further separates loose fibers out in a second step; a trommel separator that further filters the broken down components of the tennis balls for use in new products.

20 Claims, 22 Drawing Sheets
(3 of 22 Drawing Sheet(s) Filed in Color)

(56) References Cited

U.S. PATENT DOCUMENTS

2004/0094641 A1* 5/2004 Chen ................. B02C 23/08
 241/23
2018/0220746 A1* 8/2018 Krause ............... B02C 23/10

* cited by examiner

TENNIS BALL RECYCLING SYSTEM, APPARATUS AND METHOD OF USE

CROSS-REFERENCE TO RELATED APPLICATIONS

This application claims the benefit of priority to U.S. Provisional Patent Application No. 63/159,900, filed Mar. 11, 2021 and entitled "Method And Apparatus To Recycle Tennis Balls Into Useable Products," the entire contents of the application being incorporated herein by reference in its entirety.

TECHNICAL FIELD

The present disclosure describes a system for tennis ball recycling, and more particularly an apparatus and method for processing tennis balls into one or more constituent components to generate useful products. The useful products may be any number of products formed from one or more of the constituent components, including for example, a crumb rubber, nylon, and horse footings that are a combination of rubber and nylon pieces.

BACKGROUND

Tennis balls are made up of three main layers: a rubber core, a layer of latex rubber glue, and a blend of nylon and wool felt. The main material is rubber from Hevea and Ficus tree, latex, and sap that contains fine-particle filters.

Nationwide, approximately 125 million used tennis balls wind up in America's landfills every year. That is 20,000 metric tons of methane-producing, near non-decomposable rubber waste. U.S. tennis players recognize this as a significant environmental problem and want to be part of the solution.

SUMMARY

In view of the number of tennis balls disposed of annually, it is desirable to have a dependable, durable recycling method, system and apparatus that can process tennis balls into reusable products that would otherwise be thrown away. The present disclosure provides an apparatus, system, and method of breaking down tennis balls for recycling and for use once broken down. For example, once processed according to the present disclosure, the recycled tennis balls may be formed into crumb rubber, nylon, and horse footings, which is a combination of rubber and nylon pieces, to name just a few. Depending on the desired use, the end products of crumb rubber, nylon and horse footings can be of various sizes and purity. The system, apparatus, and method can be modified to accommodate the desired end product, and other end products formed from the tennis balls recycled using the system, apparatus, or method disclosed herein are also contemplated.

In an exemplary embodiment, the method can include one or more of six processing steps, including feeding, grinding (shredding), cyclonic extracting, trommel separation, and vibrational filtering, such that the tennis balls are broken-down for formation into new products. In an additional exemplary embodiment, the method also includes an additional fine cyclonic cleaning step.

In an exemplary embodiment, the method of breaking down the tennis balls comprises one or more of the following steps and apparatuses: (i) Collecting the tennis balls for recycling and placing them into a hopper. The hopper holds the tennis balls that are then fed into a grinder of the recycling apparatus, which is operatively connected to the hopper. In an exemplary embodiment, a feeder auger is constructed and arranged to supply the tennis balls to be recycled from the hopper to the grinder. The feeder auger receives the balls from the hopper at one end and deposits the balls at its opposite end into the grinder. (ii) Deconstructing the tennis balls and separating the nylon from the rubber can then be performed by the grinder. The grinder includes a plurality of rotating blades that operate to cut and separate the tennis balls. The grinder is also operatively connected to a cyclonic extractor. The cyclonic extractor pulls the cut and separated course nylon and rubber from the grinder in order to move them to the next step in the recycling process. (iii) The cyclonic extractor comprises an aeration system that operates to separate loose fibers from other broken-down components of the tennis balls. The aeration may be achieved by a vortex that is created within the cyclonic extractor to remove the less-dense loose fibers. The cyclonic extractor is operatively connected to a trommel separator. In an exemplary embodiment, a second feeder auger moves the broken-down components from the cyclonic extractor to the trommel separator. (iv) Separation of the rubber from the nylon now proceed by use of the trommel separator. The trommel separator comprises a set of screens inside a rotating drum and a vacuum system to separate the rubber from the nylon of the broken-down tennis balls. The trommel separator is operatively connected to an exit chute and the vibration deck. In one embodiment the broken-down rubber and nylon exits the trommel separator at this point and is removed to be used as a component in new products. In an exemplary embodiment the removed broken-down rubber and nylon is used to make horse footings.

In another exemplary embodiment, the trommel separator can be operatively connected to a vibration filter by a feeder auger. When broken-down rubber and nylon travel to the vibration filter it undergoes further processing. (v) If desired, further filtration of the broken-down rubber and nylon can be processed. In an exemplary embodiment the vibration filter utilizes a progressive filtration system to further clean the broken-down tennis ball components. The vibration filtration system may include one or more screen layers supported on a deck and connected to a motor. When the deck vibrates, the tennis ball components pass through the one or more screen layers in order to further filter the broken-down tennis ball components. The components may then be removed through operatively connected exit chutes. From the exit chutes the broken-down tennis components travel out of their respective exit chutes and can either be further refined by passing through additional screen layers or can be used as a component in new products.

In another exemplary embodiment, the trommel separator is also operatively connected to a fine cyclonic cleaner. Instead of entering the vibration deck, a fine cyclonic cleaning step utilizes a fine cyclonic cleaner to further separate the rubber from the nylon. The fine cyclonic extractor is operatively connected to an exit shut. Broken-down tennis components that travel out of the exit chute, largely consists of nylon that can be used as a component in new products, such as clothing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of at least one embodiment are discussed below with reference to the accompanying figures, which are not necessarily drawn to scale, emphasis instead being placed upon illustrating the principles disclosed herein. The figures are included to provide an illustration and a further understanding of the various aspects and embodiments and are incorporated in and constitute a part of this specification but are not intended as a definition of the limits of any particular embodiment. The figures, together with the remainder of the specification, serve only to explain principles and operations of the described and claimed aspects and embodiments, but are not to be construed as limiting embodiments. In the figures, each identical or nearly identical component that is illustrated in various figures is represented by a like numeral. For purposes of clarity, not every component may be labeled in every figure.

DETAILED DESCRIPTION OF THE ILLUSTRATIVE EMBODIMENTS

The examples of the apparatus discussed herein are not limited in application to the details of construction and the arrangement of components set forth in the following description or illustrated in the accompanying drawings. It will be understood to one of skill in the art that the apparatus is capable of implementation in other embodiments and of being practiced or carried out in various ways. Examples of specific embodiments are provided herein for illustrative purposes only and are not intended to be limiting. Also, the phraseology and terminology used herein is for the purpose of description and should not be regarded as limiting. Any references to examples, embodiments, components, elements or acts of the apparatus herein referred to in the singular may also embrace embodiments including a plurality, and any references in plural to any embodiment, component, element or act herein may also embrace embodiments including only a singularity (or unitary structure). References in the singular or plural form are not intended to limit the presently disclosed apparatus, its components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
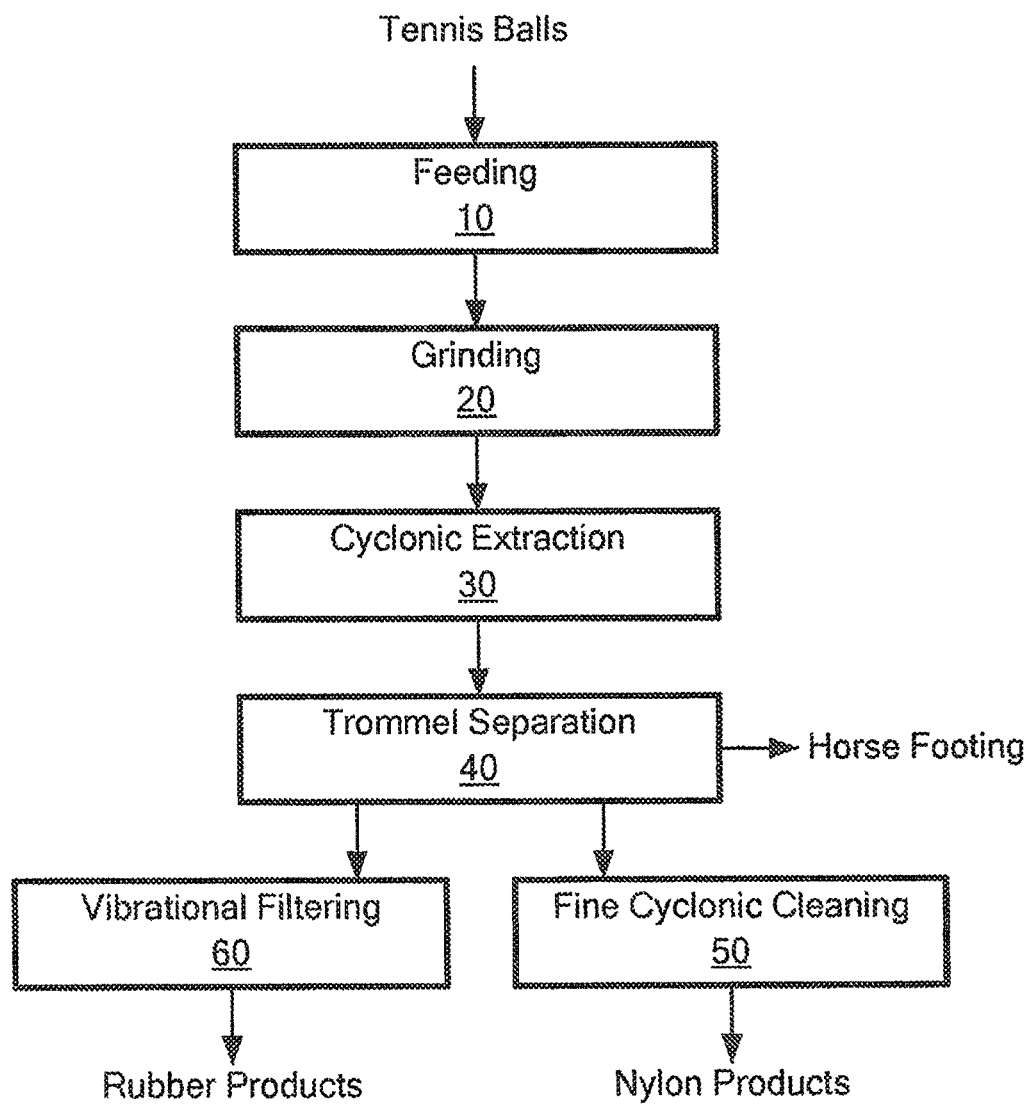
FIG. 1 is a flowchart of the overall process or recycling tennis balls into useable products, in accordance with the present disclosure.
Figure 2:
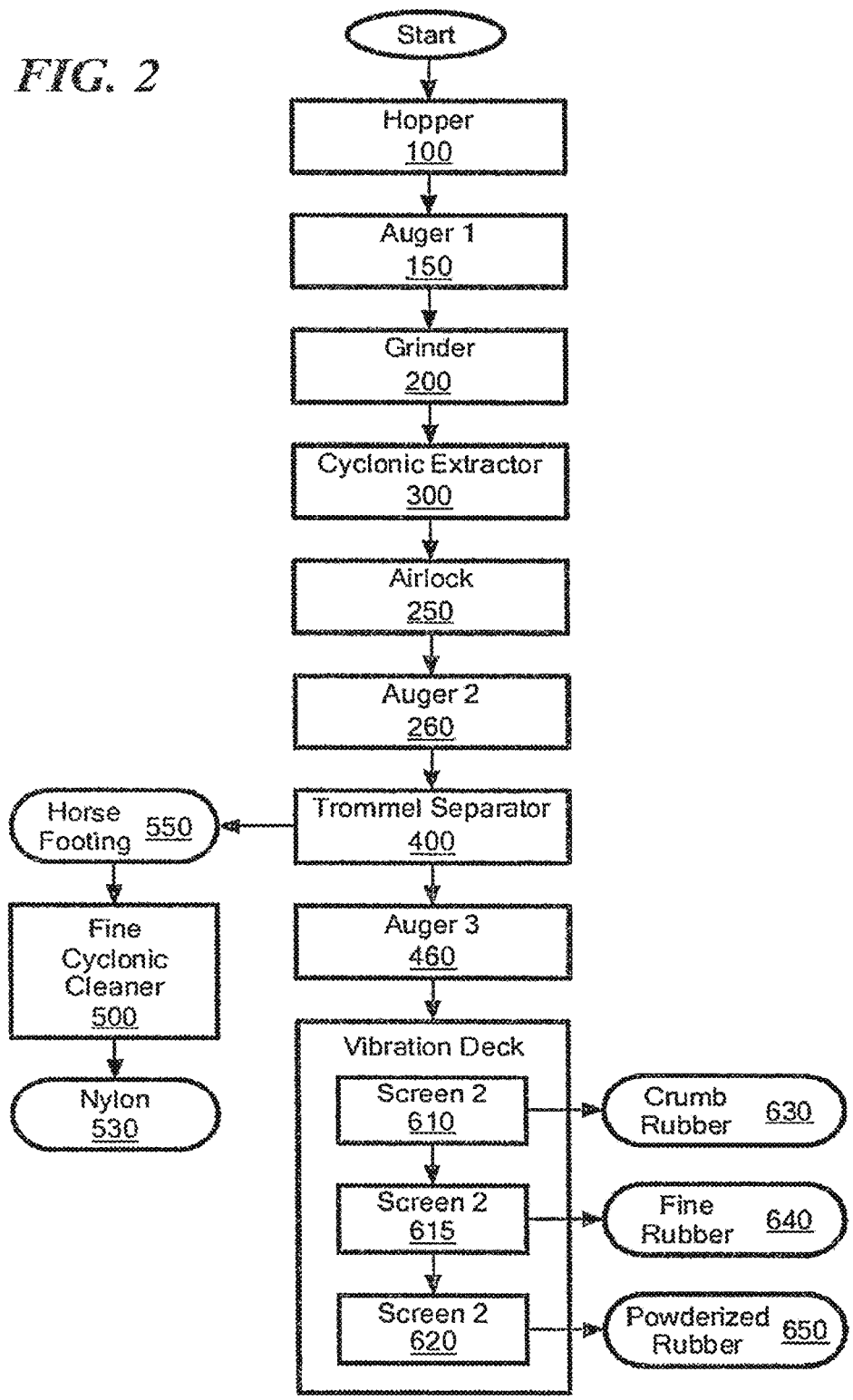
FIG. 2 is a schematic drawing of the overall process and machine to recycle tennis balls to usable products, in accordance with the present disclosure.
Figure 3:
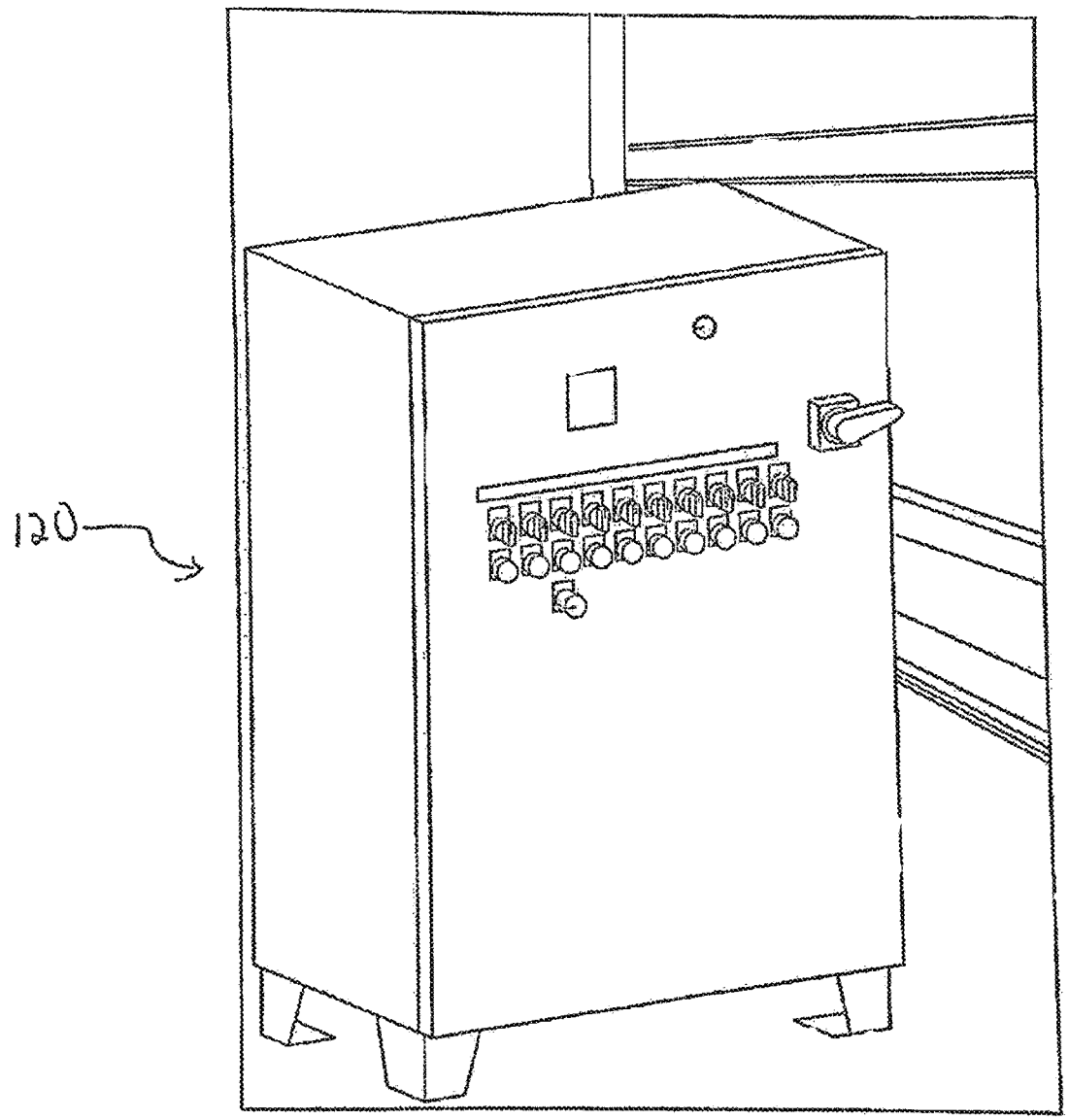
FIG. 3 is a schematic of the control unit for the tennis ball recycling machine.
Figure 4:
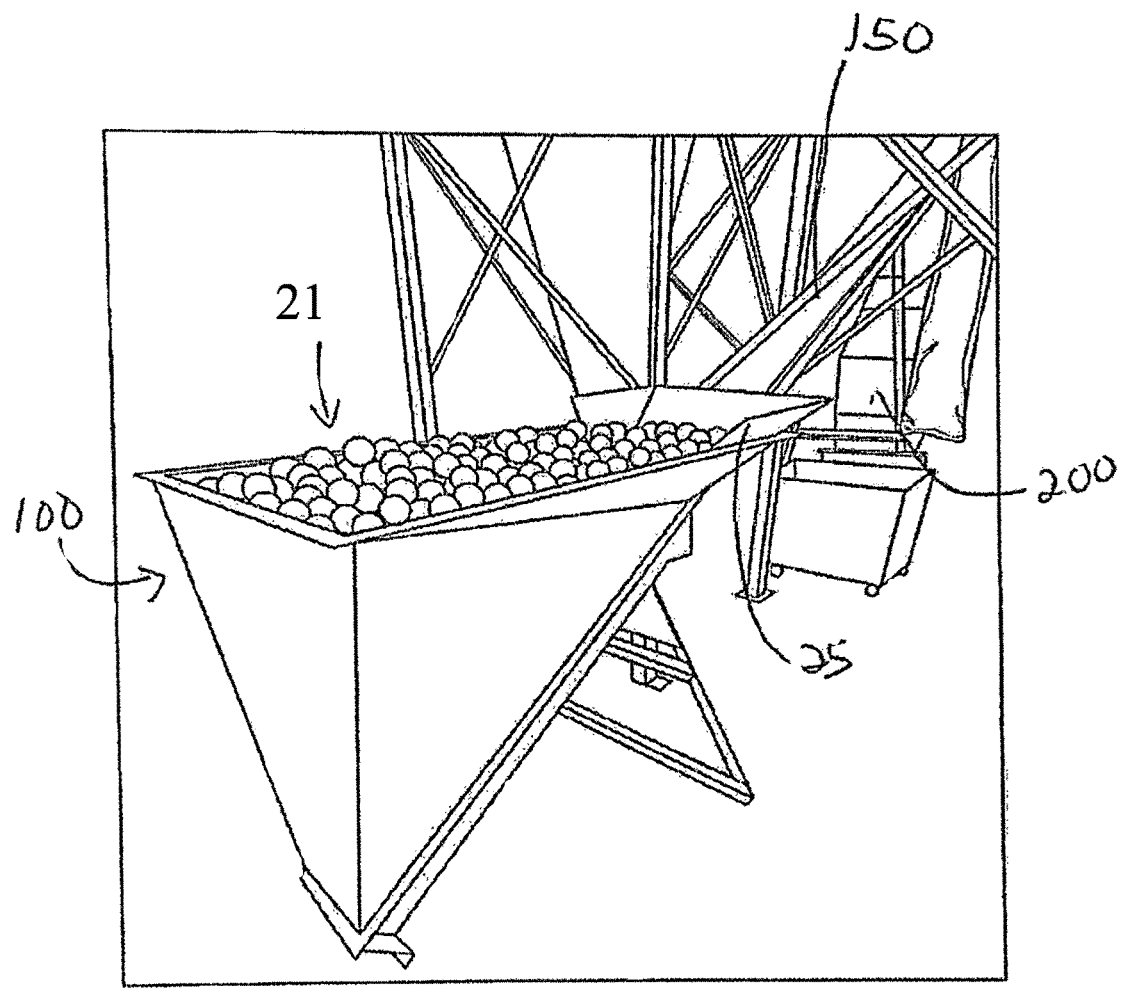
FIG. 4 is a perspective view of a hopper, feeding auger and grinder of the recycling machine to recycle tennis balls according to one embodiment.
Figure 5:
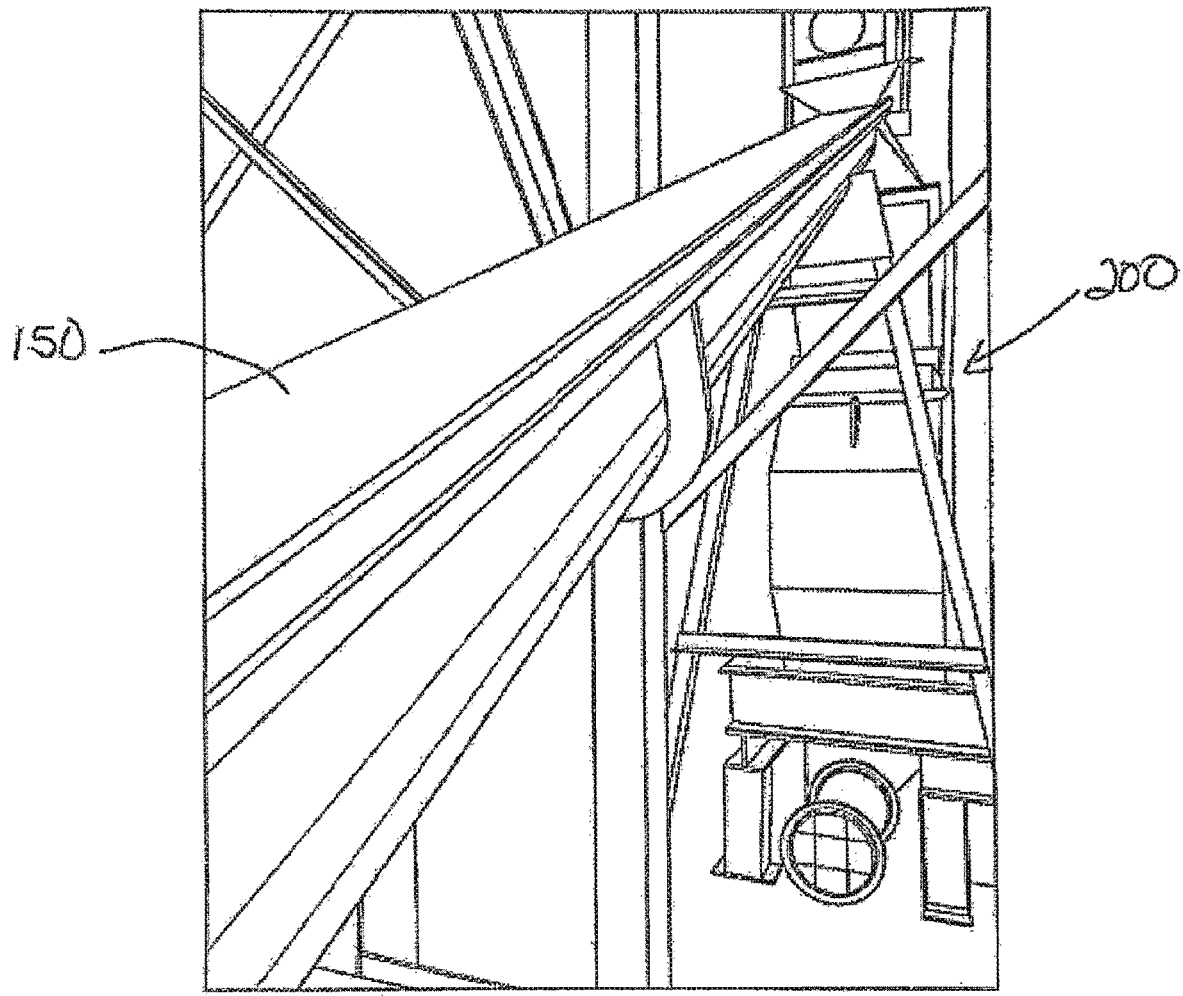
FIG. 5 is an enlarged perspective view of the feeding auger and grinder of FIG. 4.
Figure 6:
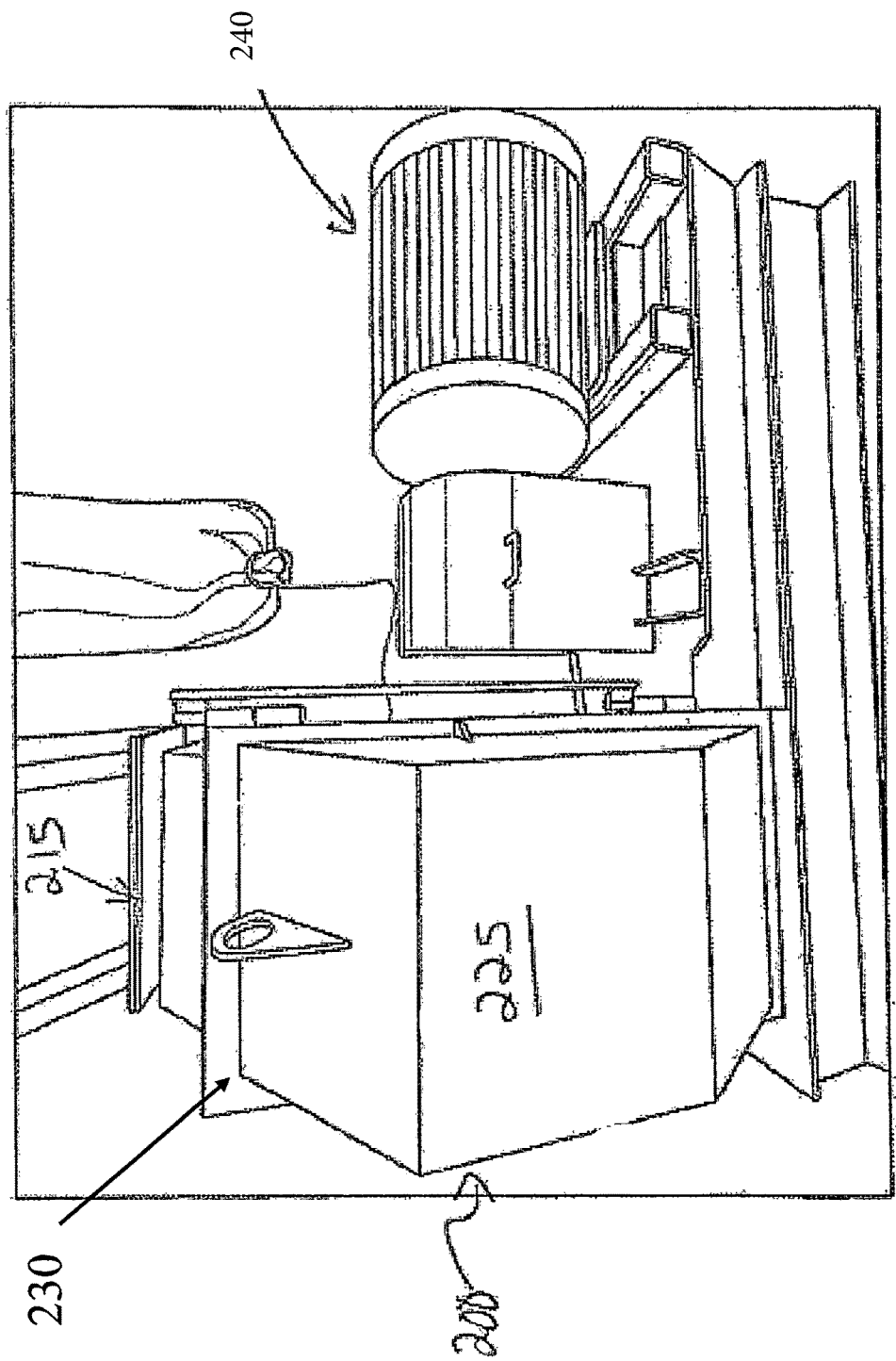
FIG. 6 is a perspective view of the grinder of FIG. 4 in a closed position.
Figure 7:
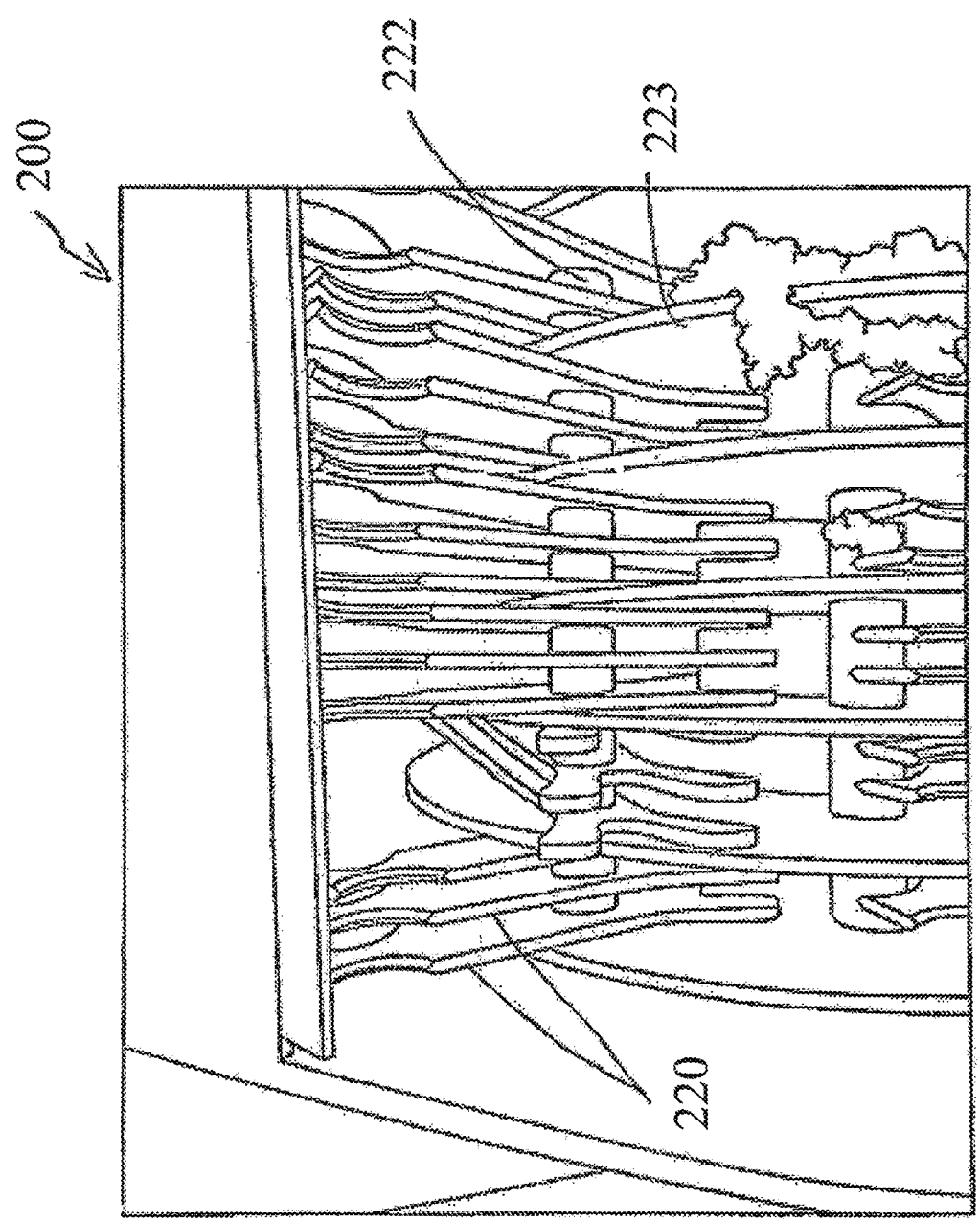
FIG. 7 is an enlarged view of the grinder of FIG. 6 in an open position during one step of operation.
Figure 8:
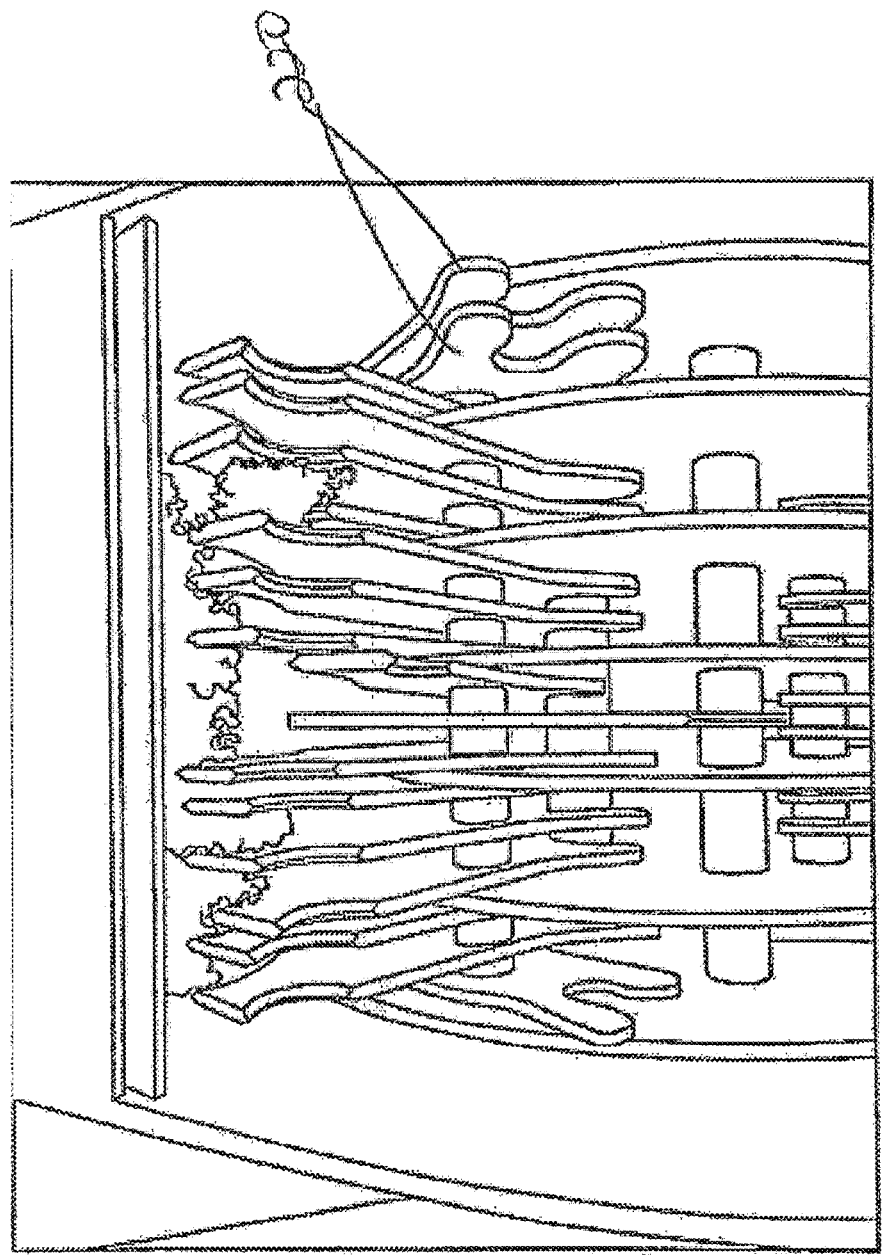
FIG. 8 is an enlarged view of the grinder of FIG. 6 in an open position during a second step of operation.

Referring initially to FIGS. 1 and 2, the overall process for recycling the tennis balls into useable products is illustrated in a flow chart and schematic. In feeding step 10, tennis balls 21 are fed into the recycling machine by placing the tennis balls 21 into hopper 100. Referring also to FIGS. 3-4, a control unit 120 for running the various stages of the tennis-ball recycling machine is illustrated as well as hopper 100. Hopper 100 may have a pyramid shaped base, although other shapes are contemplated, and may include guides 25 to aid in keeping the tennis balls 21 in a full hopper. Although the hopper 100 can be designed to hold any number of tennis balls 21, in an exemplary embodiment, the hopper is designed to hold between 1000 and 2000 tennis balls. One of ordinary skill in the art, however, can appreciate that the size and shape of the hopper can vary based on the volume of tennis balls to be held. Hopper 100 is operatively connected to feeder auger 150, which is operatively connected to grinder 200.

In an exemplary embodiment, feeder auger 150 is operatively connected at the hopper's base as would be known by one of ordinary skill in the art. It will further be appreciated that the feeder auger 150 may be operatively connected to the hopper at other locations. Feeder auger 150 comprises a continuous screw auger on a central shaft within a channel and includes clamps for support, if needed. In an exemplary embodiment, six clamps are used and the length of feeder auger 150 is approximately 20 feet and is sized and designed to accommodate a standard tennis ball having a diameter of approximately 2.575 inches. One of ordinary skill in the art would understand that more or less clamps may be used, and the length of the feeder auger and components may vary depending on the size of the feeder auger, the size of the tennis balls, which can also include youth or toy tennis balls, the other components of the apparatus, and the volume of tennis balls needed to be transported. The components, size and shape of the feeder auger 150 need only be sufficient to move the tennis balls 21 from the hopper into grinder 200.

Figure 9:
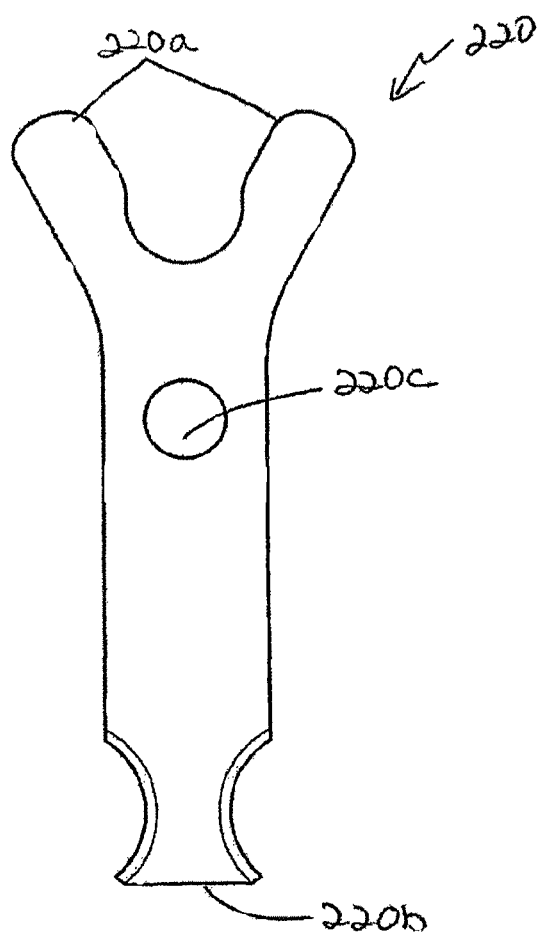
FIG. 9 is a top plan view of an exemplary grinder blade of the grinder of FIG. 6.
Figure 10:
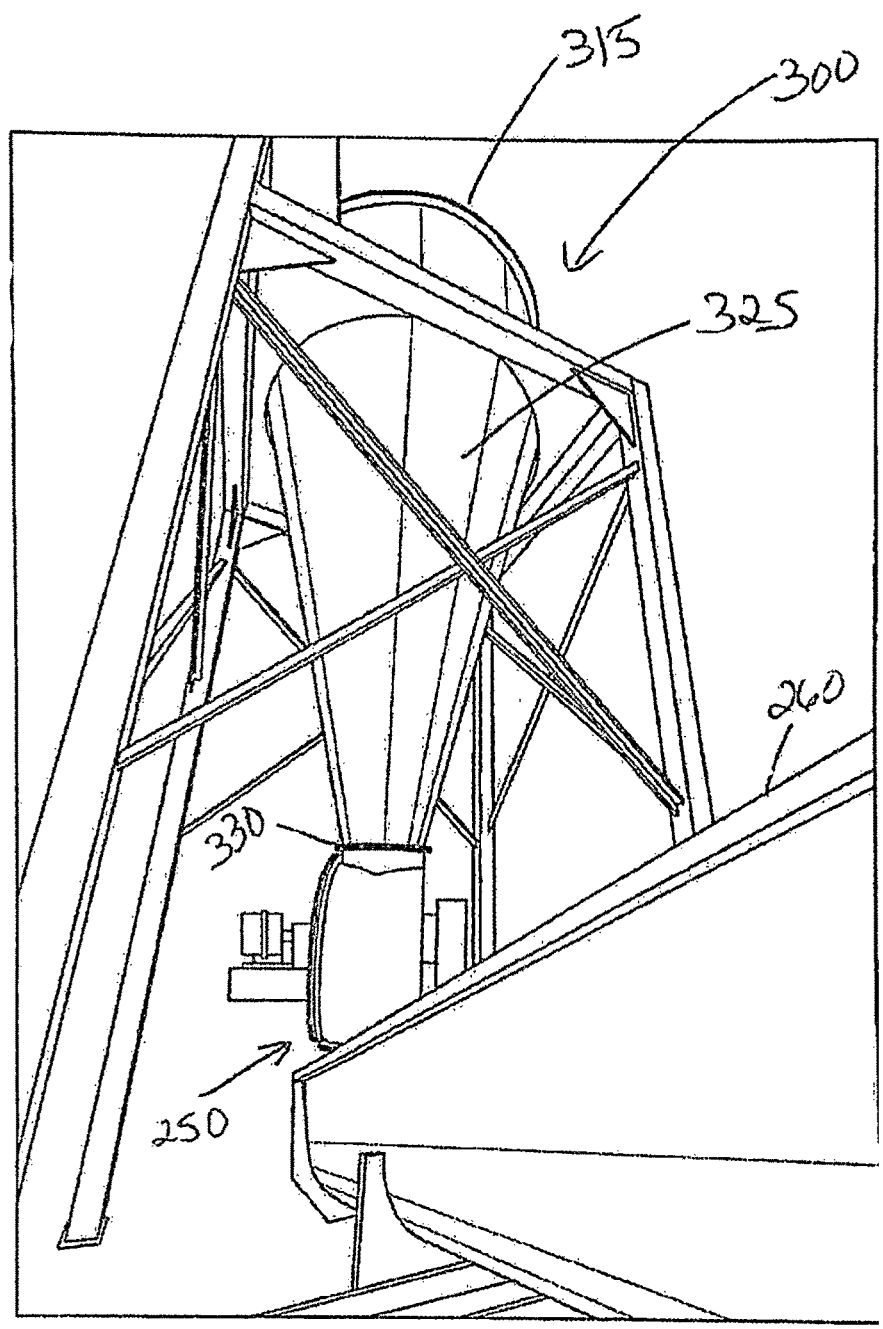
FIG. 10 is a bottom perspective view of the cyclonic extractor according to one embodiment.
Figure 11:
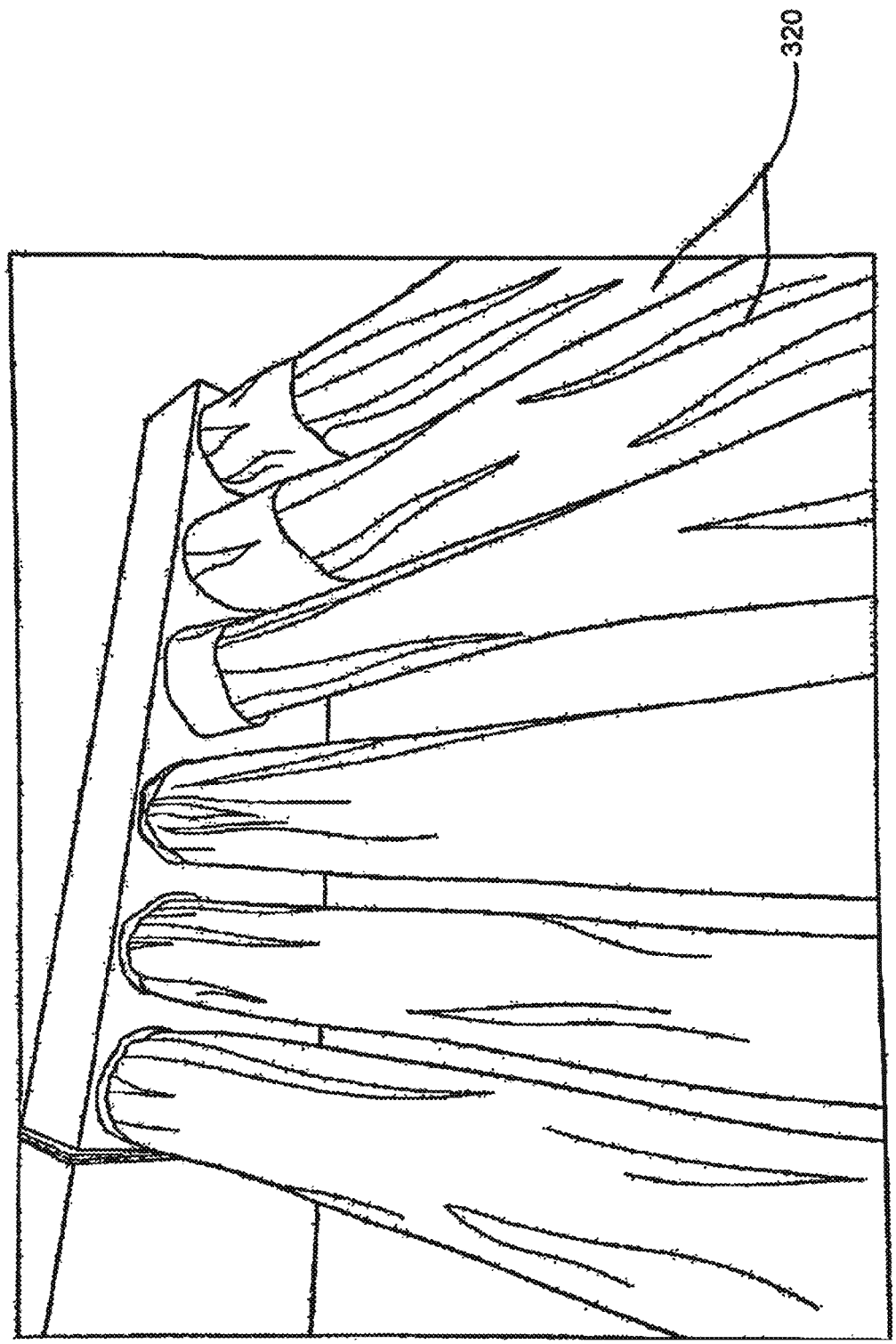
FIG. 11 is a perspective view of filter bags for the cyclonic extractor of FIG. 10.
Figure 12:
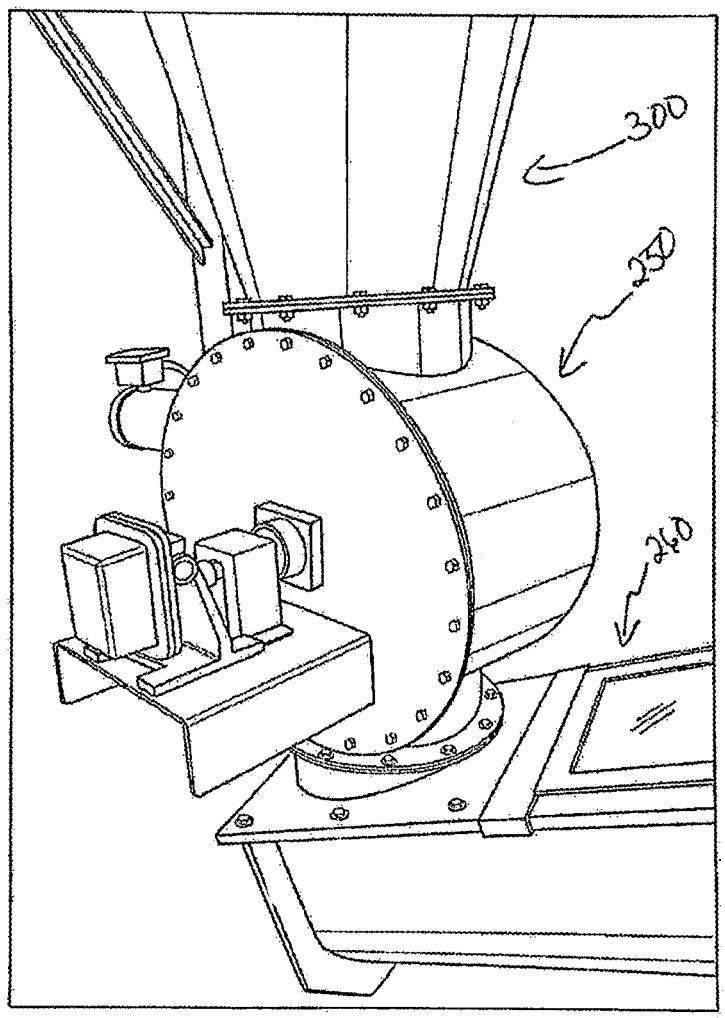
FIG. 12 is a perspective view of the airlock components of the cyclonic extractor of FIG. 10.
Figure 13:
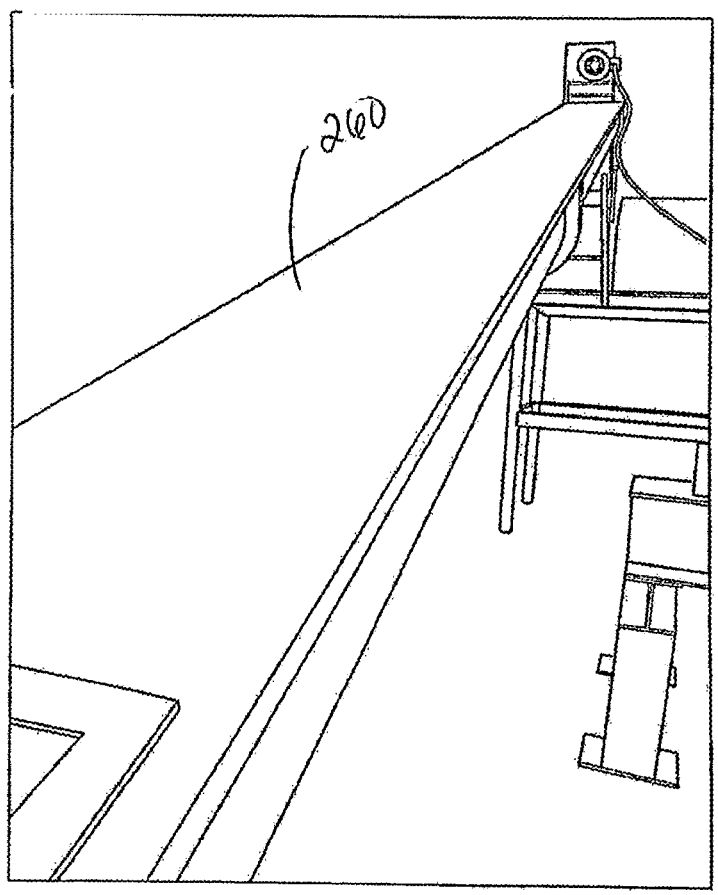
FIG. 13 is a perspective view of a second auger for delivering the extracted material to a trommel separator according to one embodiment.

In grinding step 20, the tennis balls 21 are deconstructed in grinder 200 by blades 220 (FIGS. 6-9) that cut and separate the nylon and rubber from the tennis balls 21. Grinder 200 comprises a housing 225, inlet 215, a set of blades 220, an outlet 230, and a motor 240. As shown in FIG. 9, the blades 220 may have a generally y-shape with forked members 220a at one end and a cutting member 220b at the other end. An opening 220c in the body of the blade 220 is used to mount the blades on a rotational shaft 222. The motor powers the rotational shaft 222 of the grinder thereby causing the blades to rotate and breakdown the rubber and nylon of the tennis balls as they travel through the grinder 200 between the blades 220. The "grind size" or level of dismantling of the tennis balls in the grinder can be manipulated by a variety of adjustments, including, but not limited to: 1) motor RPM; 2) blade teeth size, geometry, number and position; 3) blade tolerance; 4) rate of loading and feeding of tennis balls; and 5) screen sizes. In an exemplary embodiment, the grinder includes 64 blades and is powered by a motor having a HP range of 75-200 HP. One of ordinary skill in the art, however, can appreciate that the number of blades and power of the motor can vary depending on the volume of tennis balls to be ground, the rate at which the tennis balls are ground and the other components of the apparatus. As the tennis balls travel through the grinder, the nylon and rubber components of the tennis balls are cut and ground so that the tennis balls are broken down and the rubber and felt components of the tennis balls can be separated. Optimization of grinder 200 can increase the effectiveness of grinding step 20 and can reduce any processing steps that may be required down-stream for effective recovery of tennis ball components. Grinder 200 is operatively connected to cyclonic extractor 300 for further processing of the rubber and felt components of the tennis balls (FIG. 10).

Referring now to FIGS. 10-13 in conjunction with FIG. 1, during the cyclonic cleaning/extracting step 30, the cut nylon and rubber of the tennis balls are pulled from grinder 200 by cyclonic extractor 300. Cyclonic extractor 300 comprises an inlet 315, a funnel-shaped or tapered body 325, collection bags 320, an air filter, and an outlet 330. The broken-down rubber and nylon from grinder 200 enter cyclonic extractor 300 where it is aerated. The aeration operates to separate loose fibers from other broken-down components of the tennis balls. The aeration may be achieved by a vortex that is created within the body of the cyclonic extractor to remove the less-dense loose fibers. In an exemplary embodiment, approximately 99% of the material from the grinder travels through the cyclonic extractor 300 to trommel separator 400. The remaining material is waste, consisting largely of dust, that is filtered into the collection bags 320.

In an exemplary embodiment, cyclonic extractor 300 is operatively connected to trommel separator 400 by an airlock 250 and a feeder auger 260. Airlock 250 minimizes air losses while transferring materials from the cyclonic extractor 300 and the second feeder auger 260 moves the broken-down components from the cyclonic extractor 300 to the trommel separator 400.

Figure 14:
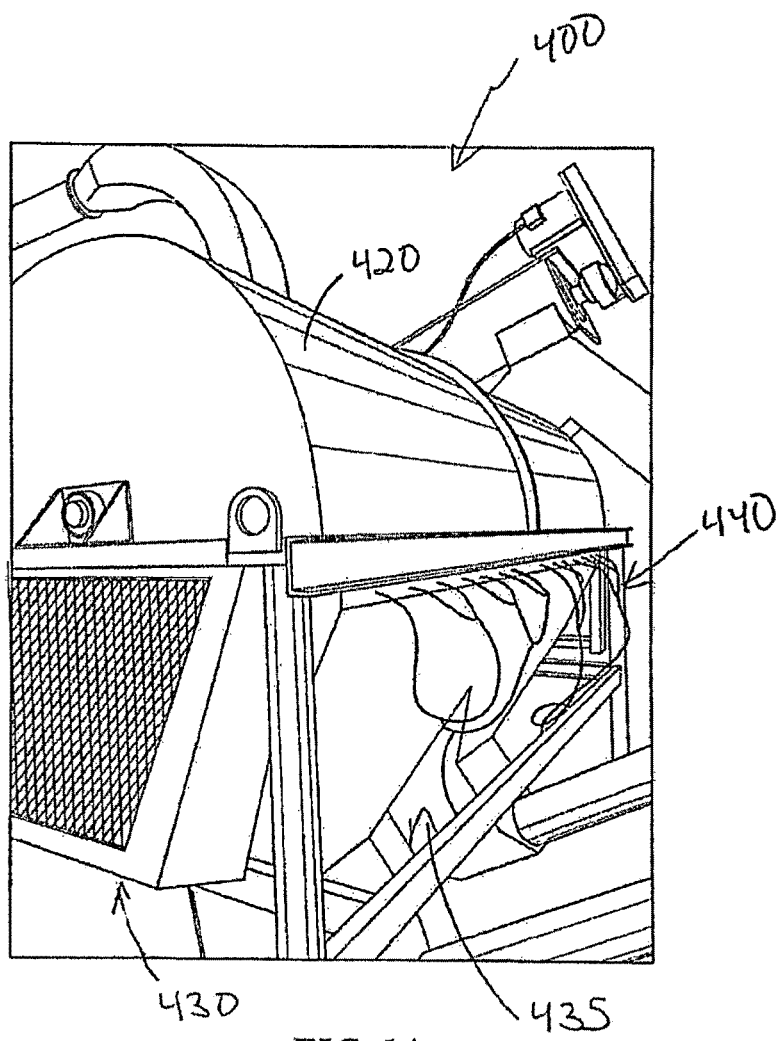
FIG. 14 is a perspective view of a trommel separator according to the present disclosure.
Figure 15:
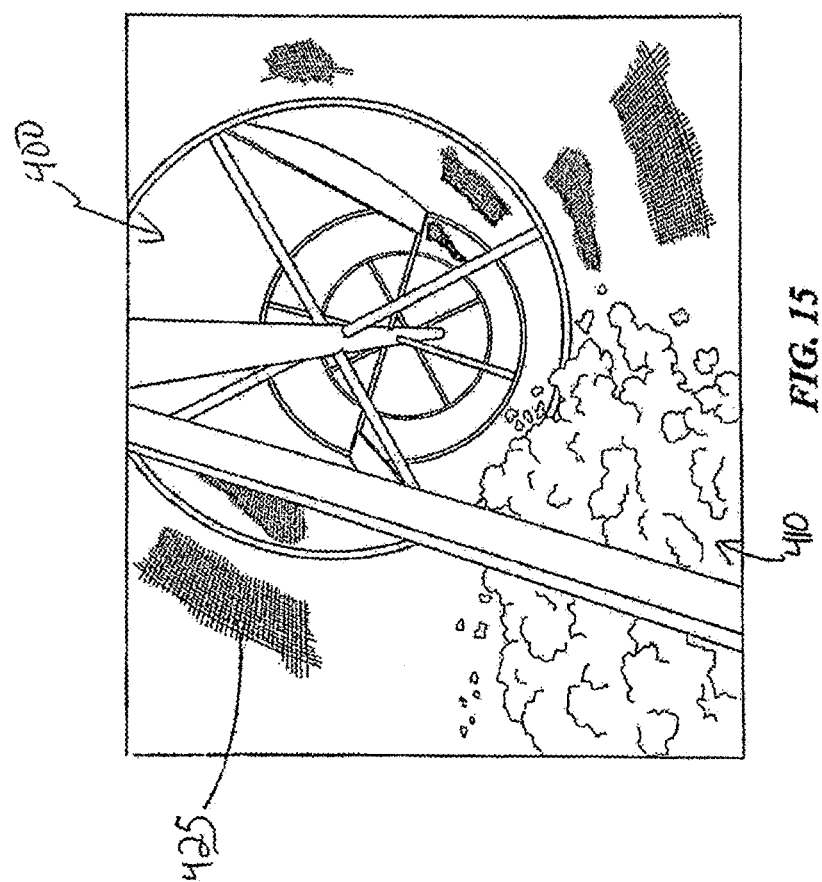
FIG. 15 is a top view of the trommel separator of FIG. 14 during use.
Figure 16:
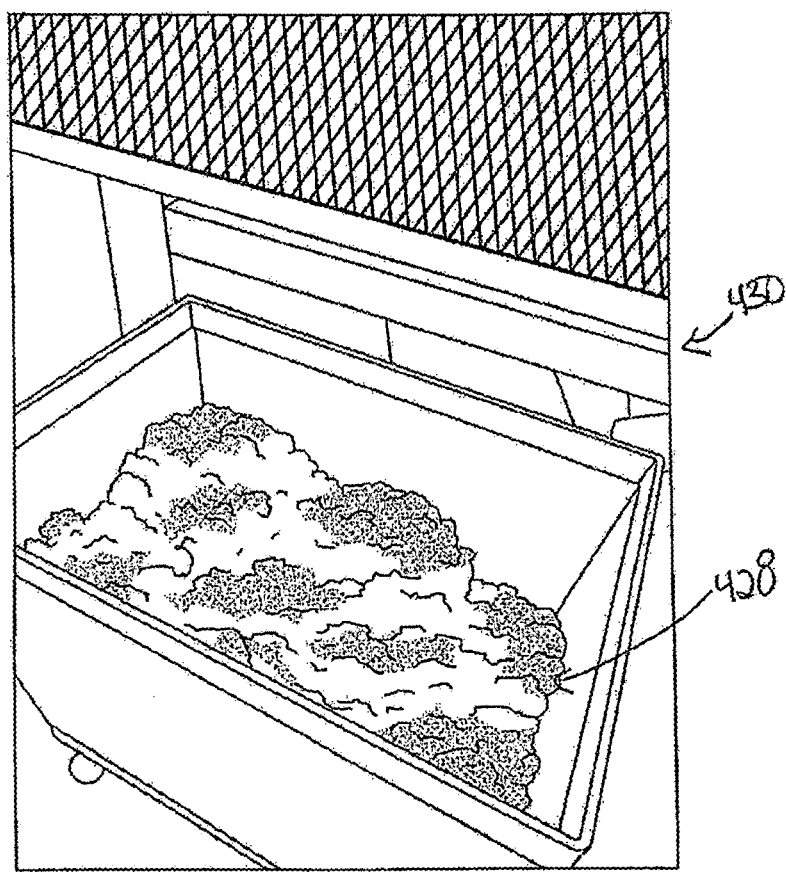
FIG. 16 is a perspective view of the separated materials after leaving the trommel separator of FIG. 14.
Figure 17:
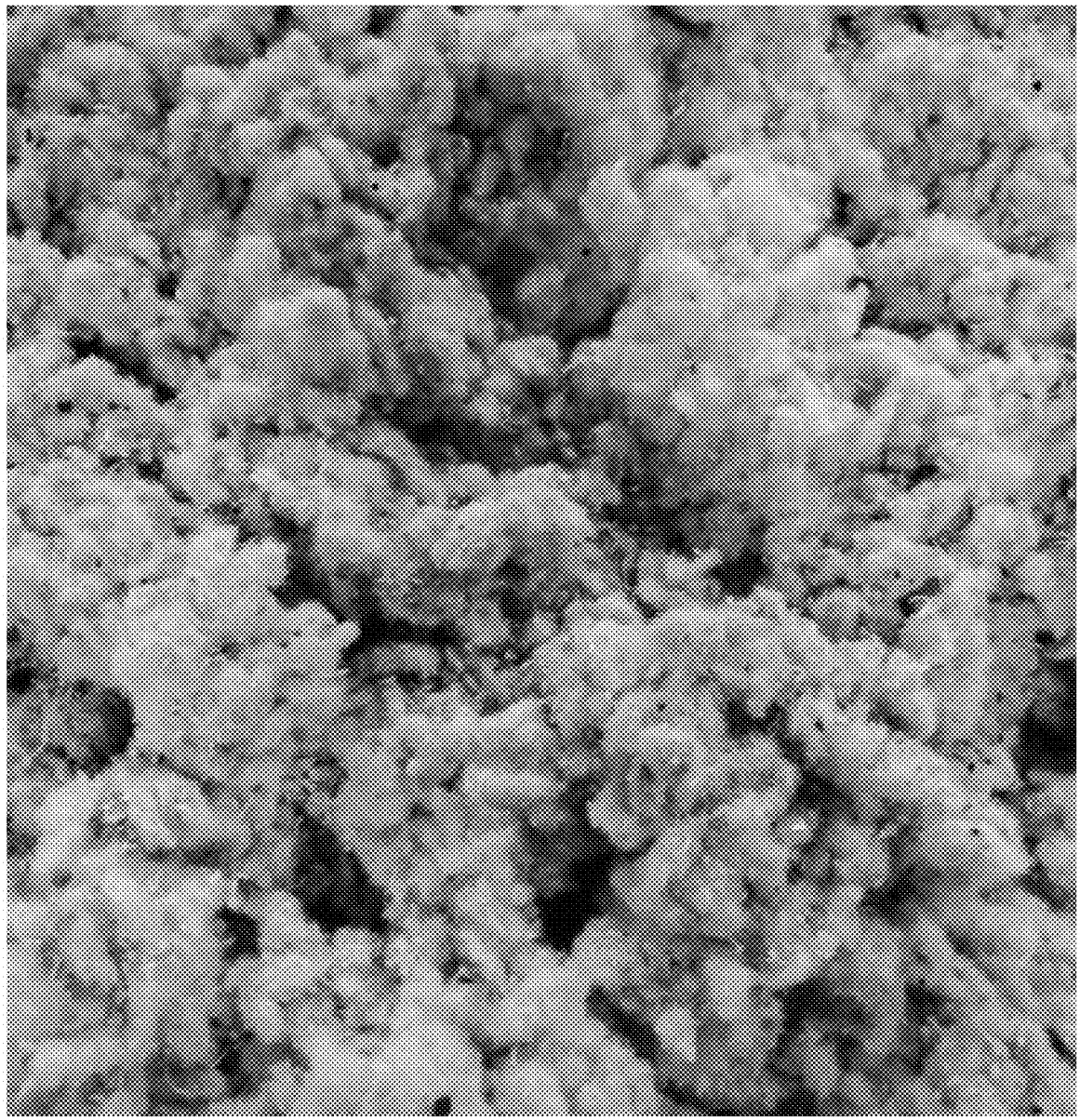
FIG. 17 is a photograph of the extracted material according to one embodiment after processing through the trommel separator of FIG. 14 showing felt particles.
Figure 18:
FIG. 18 is a photograph of the extracted materials according to another embodiment after processing through the trommel separator of FIG. 14 showing felt and rubber particles.

In the trommel separation step 40, if present, the cut nylon and rubber 410 of the tennis balls is filtered through a trommel separator 400 to further process, clean and separate the nylon and rubber as shown in FIGS. 14-16. Trommel separator 400 separates or sorts the rubber material from the felt particles and in an exemplary embodiment may include an inlet, a rotary drum 420, screens 425, an aeration system, an exit channel for material having more nylon than rubber, and an exit channel for material having more rubber than nylon. Rotary drum may slope at a predetermined angle in the longitudinal direction at the upper end of the frame. Rotary drum may further comprise a plurality of discharge holes formed along the circumference of the rotary drum, a rotating mechanism connected to one of the receiving rollers, a motor, and a power transmitting device for rotating the receiving roller by the power of the motor to rotate the drum in one direction. In a preferred embodiment, the aeration system 435 comprises air nozzles 440 to ensure that the trommel screen(s) are kept clean. Screens are used to separate the broken-down nylon and rubber components. In one exemplary embodiment, one screen has openings less than $3/16$ of an inch. Bonded rubber and nylon having a diameter less than $3/16$ of an inch fall through the screen and out an exit channel 430 and can be used for a variety of applications. For example, nylon 428 that is sufficiently separated from the rubber can be collected for use in post recycling products. One example of a post recycling product at this stage is a sand horse footing, although other products are contemplated. The extracted nylon material 428 is composed of nylon and approximately less than 5% of rubber, and in another embodiment, the extracted material is composed of nylon and approximately less than 1% of rubber. Any nylon and rubber not removed from the recycling at this stage proceeds into the fine cyclonic cleaning step 50 and/or vibration filtering step 60.

Figure 19:
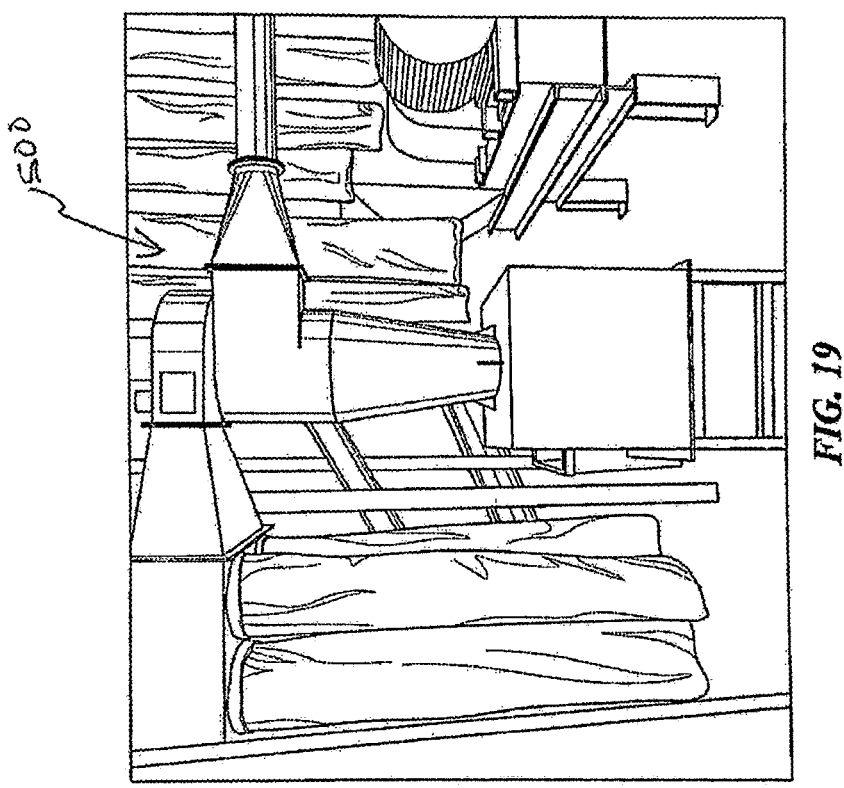
FIG. 19 is a perspective view of the fine cyclonic cleaner according to the present disclosure.
Figure 20:
FIG. 20 is a photograph of the extracted nylon materials according to one embodiment after processing through the fine cyclonic cleaner of FIG. 19.

In the fine cyclonic cleaning step 50, fine cyclonic cleaner 500 (FIG. 19) is used to further separate the rubber from the nylon such that most of the rubber is removed. The fine cyclonic cleaner 500 results in nylon 530 that is sufficiently separated from the rubber such that it can be used to manufacture apparel and other textiles. A photograph of the nylon, which has been further cleaned by fine cyclonic cleaner 500 and available to be used for articles of manufacturer, is shown in FIG. 20.

Figure 21:
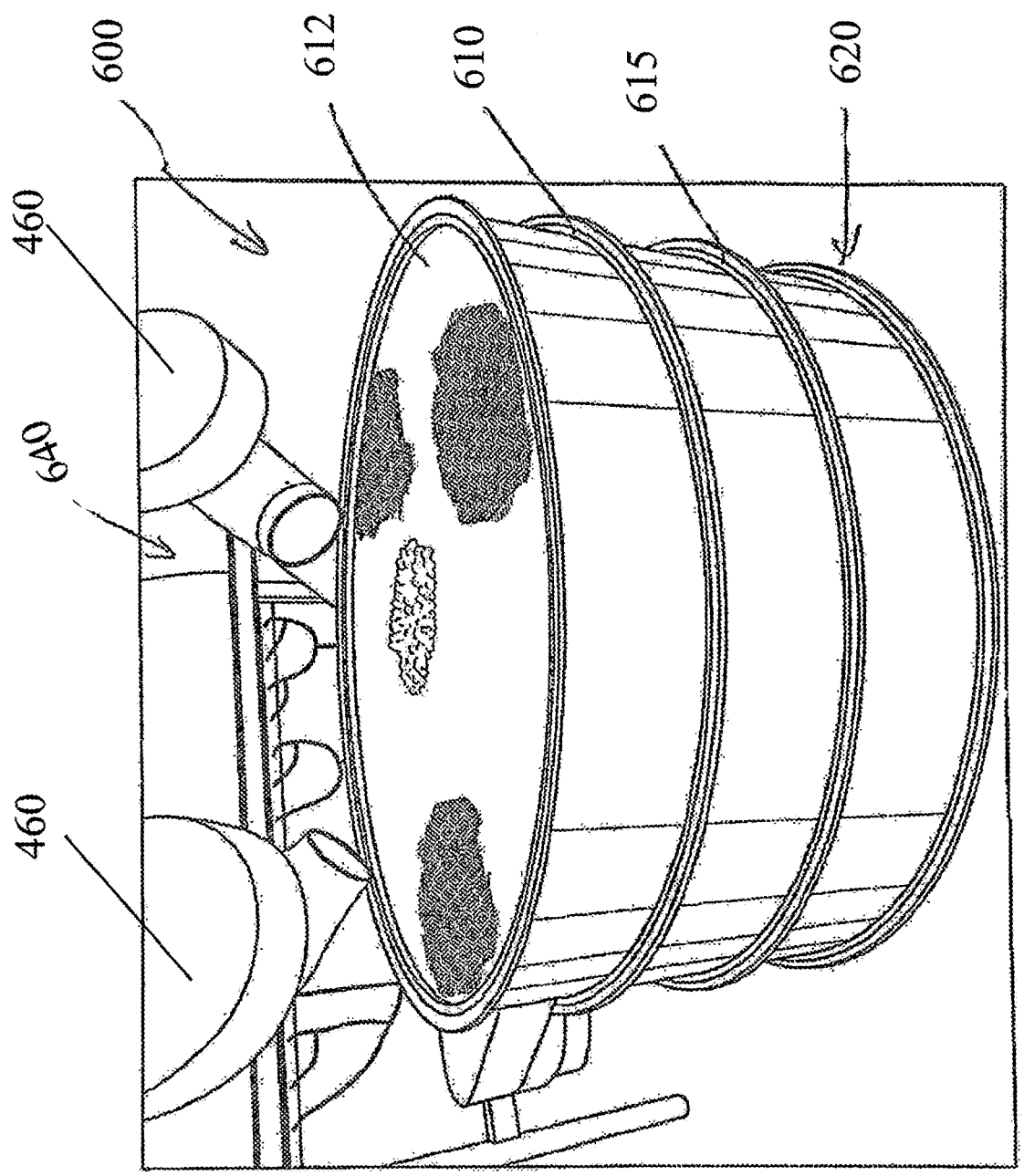
FIG. 21 is a perspective view of vibration deck according to the present disclosure.

In another exemplary embodiment, the trommel separator can be operatively connected to a vibration filter 600 by a feeder auger as shown in FIG. 21. Bonded rubber and nylon having a diameter greater than $3/16$ of an inch may be conveyed by two approximately nine-foot screw augers 460, each having a dedicated motor, to the vibration filter 600. When broken-down rubber and nylon travel to the vibration filter 600 it undergoes further processing. In an exemplary embodiment the vibration filter 600 utilizes a progressive filtration system to further clean the broken-down tennis ball components. The filtration system may include one or more vibration decks 610, 615 and 620 (all stacked on top of each other), each including screens with different diameters, and connected to a motor 640. In operation, the nylon and rubber from the trommel enters onto the top screen of vibration deck 600. When vibration deck 600 is turned on the decks 610, 615 and 620 vibrate, the tennis ball components pass through the one or more screen layers 612 in order to further filter the broken-down tennis ball components and cause the rubber and nylon to pass through the decks from the top to the bottom. In a preferred embodiment, each deck is approximately 56 inches in diameter and approximately 26 inches tall.

Vibration filter 600 may further include an output for crumb rubber, an output for fine rubber, and an output for powderized rubber. In an exemplary embodiment, the diameter of the crumb rubber 630 is approximately between $3/16^{th}$ and $1/4^{th}$ of an inch having an angular or cubical shape and the diameter of fine rubber 650 is under ³⁄₁₆$^{th}$ of an inch. Crumb rubber 630, fine rubber 650, powderized crumb rubber, and horse footing 550 all contain low odor vulcanized rubber having zinc and magnesium as its curative agents. The products are also non-abrasive, non-corrosive, non-toxic, non-explosive, non-friable, semi-hygroscopic, and/or statically charged. One of ordinary skill in the art, however, can appreciate that the characteristics of the crumb rubber and broken-down nylon are dependent on the material that travels through the apparatus and is broken down.

Figure 22:
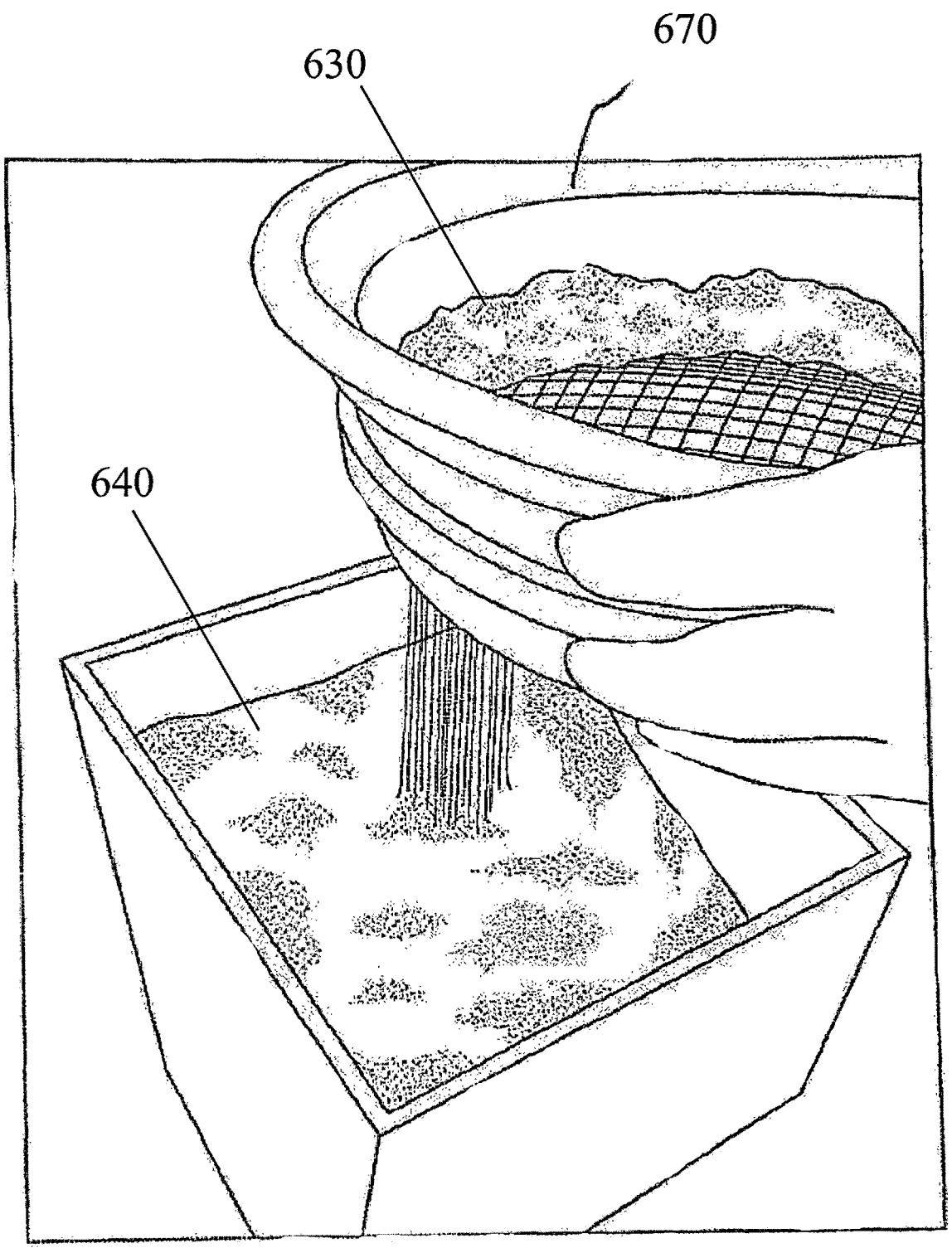
FIG. 22 is a perspective view of a filtration basket during use.

The components may then be removed from the vibration filter 600 through operatively connected exit chutes. From the exit chutes the broken-down tennis components travel out of their respective exit chutes and can either be further refined by passing through additional manual screens 670 (FIG. 22) or can be used as a component in new products.

Having thus described several aspects of at least one example, it is to be appreciated that various alterations, modifications, and improvements will readily occur to those skilled in the art, without departing from the spirit and scope of the invention as defined by the appended claims. Therefore, the claims are not to be limited to the specific examples depicted herein. For example, the features of one example disclosed above can be used with the features of another example. For instance, examples and embodiments disclosed herein may also be used in other contexts. Furthermore, various modifications and rearrangements of the parts may be made without departing from the spirit and scope of the underlying inventive concept. For example, the geometric configurations disclosed herein may be altered depending upon the application, as may the material selection for the components. Such alterations, modifications, and improvements are intended to be part of this disclosure, and are intended to be within the scope of the examples discussed herein. Thus, the details of these components as set forth in the above-described examples, should not limit the scope of the claims.

Further, the purpose of the Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the claims of the application nor is intended to be limiting on the claims in any way.

What is claimed:

1. A tennis ball recycling system for use with a plurality of tennis balls comprising rubber and nylon, the system comprising:
   a hopper configured and dimensioned to hold the plurality of tennis balls;
   a grinder including a housing supporting a shaft and a plurality of blades secured to the shaft, the plurality of blades being substantially y-shaped with a forked member at a first end of the blades and a cutting member at a second end of the blades;
   a motor operatively connected to the shaft;
   a first feeder auger configured to supply the tennis balls to be recycled from the hopper to the grinder, wherein the plurality of tennis balls are deconstructed by the plurality of blades which are constructed and arranged to cut into and separate the nylon in the tennis balls from the rubber of the tennis balls creating broken down components;
   a cyclonic extractor including an inlet to receive the broken down components of the tennis balls from the grinder, a tapered body and an outlet;
   a trammel separator including an inlet to receive the broken down components of the tennis balls from the cyclonic extractor, a rotary drum, one or more screens to further filter the broken down components of the tennis balls, and an exit channel;
   a second feeder auger configured to move the broken down components from the cyclonic extractor to the trammel separator;
   an airlock disposed between the cyclonic extractor and the trammel separator configured to minimize air loss while transferring the broken down components of the tennis balls from the cyclonic extractor to the trammel separator; and
   wherein during use further separation is done by the cyclonic extractor, which separates loose fibers from other broken down components of the tennis balls, and even further separation is done by the trammel separator, such that broken down rubber and nylon, from the broken down components, exits through the exit channel of the trammel separator and is suitable for use in new products.

2. The tennis ball recycling system of claim 1, wherein the trammel separator further includes an aeration system.

3. The tennis ball recycling system of claim 2, wherein the aeration system comprises air nozzles.

4. The tennis ball recycling system of claim 1, wherein the trammel separator is operatively connected to a vibration filter with a progressive filtration system to further clean the broken down tennis ball components.

5. The tennis ball recycling system of claim 4, wherein the broken down rubber and nylon exiting through the vibration filter includes a crumb rubber output, a fine rubber output, and a powderized rubber output.

6. The tennis ball recycling system of claim 1, wherein the broken down rubber and nylon exiting through the exit channel of the trammel separator is composed substantially of nylon and less than 5% of rubber.

7. The tennis ball recycling system of claim 6, wherein the broken down rubber and nylon exiting through the exit channel of the trammel separator is composed of nylon and less than 1% of rubber.

8. The tennis ball recycling system of claim 1, wherein the hopper includes a guide to aid in keeping the tennis balls in the hopper.

9. The tennis ball recycling system of claim 1, wherein the first feeder auger comprises a continuous screw auger.

10. A tennis ball recycling system comprising:
    a hopper configured and dimensioned to hold a plurality of tennis balls comprising nylon and rubber;
    a grinder including a housing supporting a shaft and a plurality of blades secured to the shaft, the plurality of blades including a forked member at a first end and a cutting member at a second end, opposite the first end;
    a motor operatively connected to the shaft;
    a first feeder auger configured to supply the tennis balls to be recycled from the hopper to the grinder, wherein upon entering the grinder the plurality of blades cut into the tennis balls creating broken down components;
    a cyclonic extractor including an inlet to receive the broken down components of the tennis balls from the grinder, a tapered body and an outlet;
    a second feeder auger configured to move the broken down components from the cyclonic extractor to the trammel separator;

a trammel separator including an inlet to receive the broken down components of the tennis balls from the cyclonic extractor, a rotary drum, and an exit channel, the trammel separator being operatively connected to a vibration filter including a progressive filtration system to clean the broken down tennis ball components; and wherein broken down rubber and nylon, from the broken down components, exits through the exit channel of the trammel separator and is composed substantially of nylon.

11. The tennis ball recycling system of claim 10, wherein the broken down rubber and nylon exiting through the vibration filter includes a crumb rubber output, a fine rubber output, and a powderized rubber output.

12. The tennis ball recycling system of claim 10, further comprising an airlock disposed between the cyclonic extractor and the trammel separator configured to minimize air loss while transferring the broken down components of the tennis balls from the cyclonic extractor to the trammel separator.

13. The tennis ball recycling system of claim 10, wherein the hopper includes a pyramid shaped base.

14. The tennis ball recycling system of claim 10, wherein the hopper further includes a guide to aid in keeping the tennis balls in the hopper.

15. The tennis ball recycling system of claim 10, wherein the first feeder auger comprises a continuous screw auger on a central shaft.

16. The tennis ball recycling system of claim 10, wherein the cyclonic extractor further includes an air filter.

17. The tennis ball recycling system of claim 10, wherein the trammel separator further includes an aeration system.

18. The tennis ball recycling system of claim 10, in combination with the plurality of tennis balls comprising nylon and rubber.

19. The tennis ball recycling system of claim 10, wherein the trammel separator is operatively connected to a fine cyclonic cleaner.

20. The tennis ball recycling system of claim 10, wherein the broken down rubber and nylon exiting through the exit channel of the trammel separator is composed of nylon and less than 5% of rubber exiting the exiting through the trammel separator exit channel is composed of nylon and approximately less than 1% of rubber.

* * * * *